United States Patent [19]
Grover et al.

[11] 3,713,234
[45] Jan. 30, 1973

[54] TRANSPLANTER WITH STRESS COMPENSATING BLADE GUIDE MEANS

[76] Inventors: Russell C. Grover, 1277 Cove Ave., Lakewood, Ohio 44107; Phillip C. Grover, 73 Long Common Rd. Apt. 1A, Riverside, Ill. 60654

[22] Filed: Sept. 25, 1970

[21] Appl. No.: 75,583

[52] U.S. Cl. ............................................... 37/2 R
[51] Int. Cl. ............................................ A01g 23/04
[58] Field of Search ..................................... 37/2 R

[56] References Cited

UNITED STATES PATENTS

| | | | |
|---|---|---|---|
| 3,460,277 | 8/1969 | Grover et al. | 37/2 R |
| 2,549,476 | 4/1951 | Johnson | 37/2 R |
| 3,364,601 | 1/1968 | Korenek | 37/2 R |
| 3,618,234 | 11/1971 | Bates | 37/2 R |
| 3,017,708 | 1/1962 | Gardner | 37/2 R |
| 3,589,039 | 6/1971 | Korenek | 37/2 R |
| 3,017,719 | 1/1962 | Sigler et al. | 37/2 R X |
| 2,729,493 | 1/1956 | Engel | 37/2 R |

*Primary Examiner*—Robert E. Pulfrey
*Assistant Examiner*—R. E. Suter
*Attorney*—Hill, Sherman, Meroni, Gross & Simpson

[57] ABSTRACT

A transplanter for transferring a growing plant, shrub, tree, bush, or the like, from one location to another, the transplanter being equipped with cutting blades which converge when forced into the ground around the plant to prune the roots of the plant and sever a mass of earth around the remaining roots and retain the plant and earth mass until the same is placed in its new location, the transplanter also being usable to first provide a suitable hole for the reception of the mass of earth around the plant in the new location.

6 Claims, 13 Drawing Figures

PATENTED JAN 30 1973
3,713,234
SHEET 1 OF 4
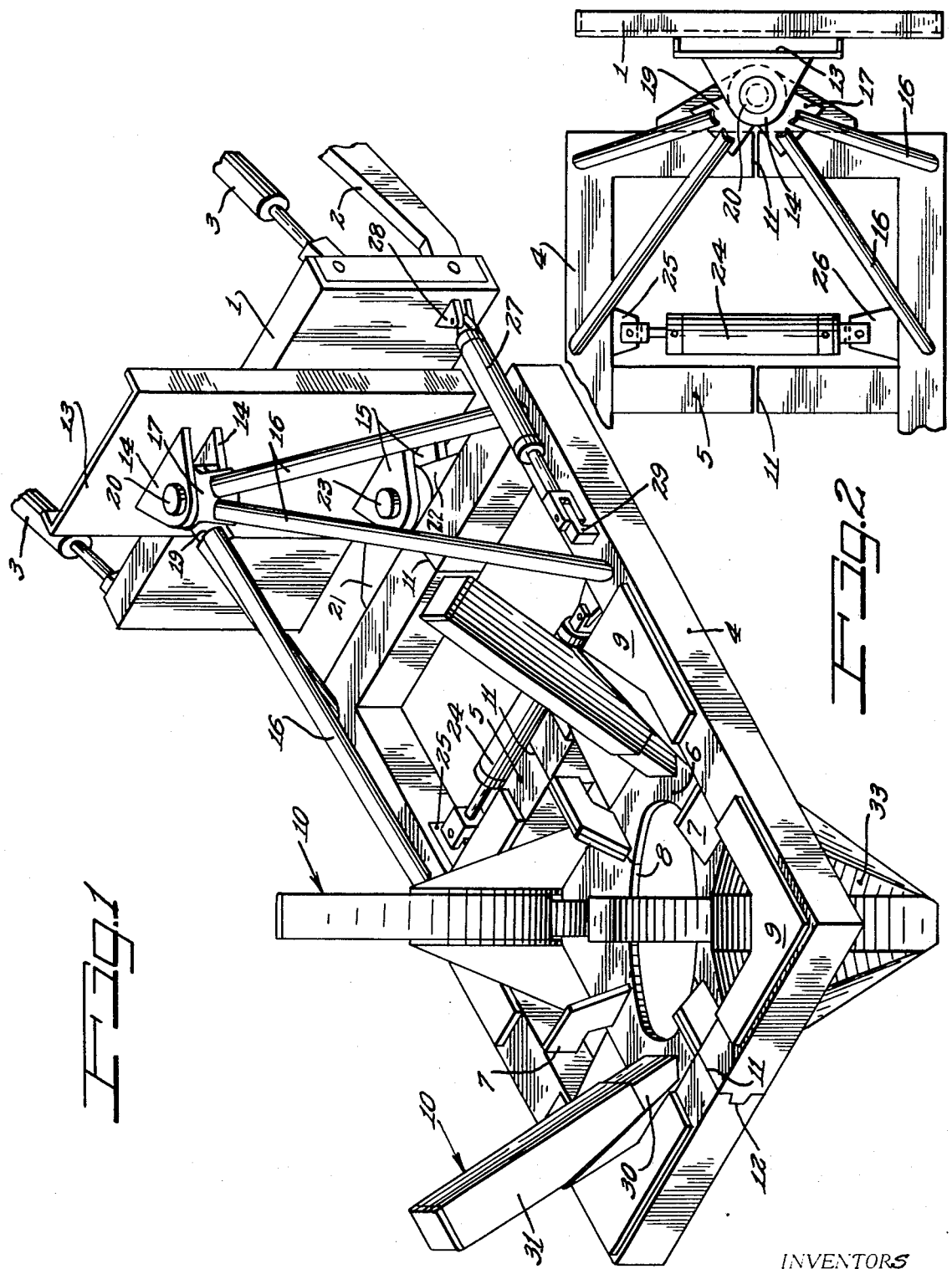
INVENTORS
Russell C. Grover
Phillip C. Grover
BY Hill, Sherman, Meroni, Gross & Simpson
ATTORNEYS

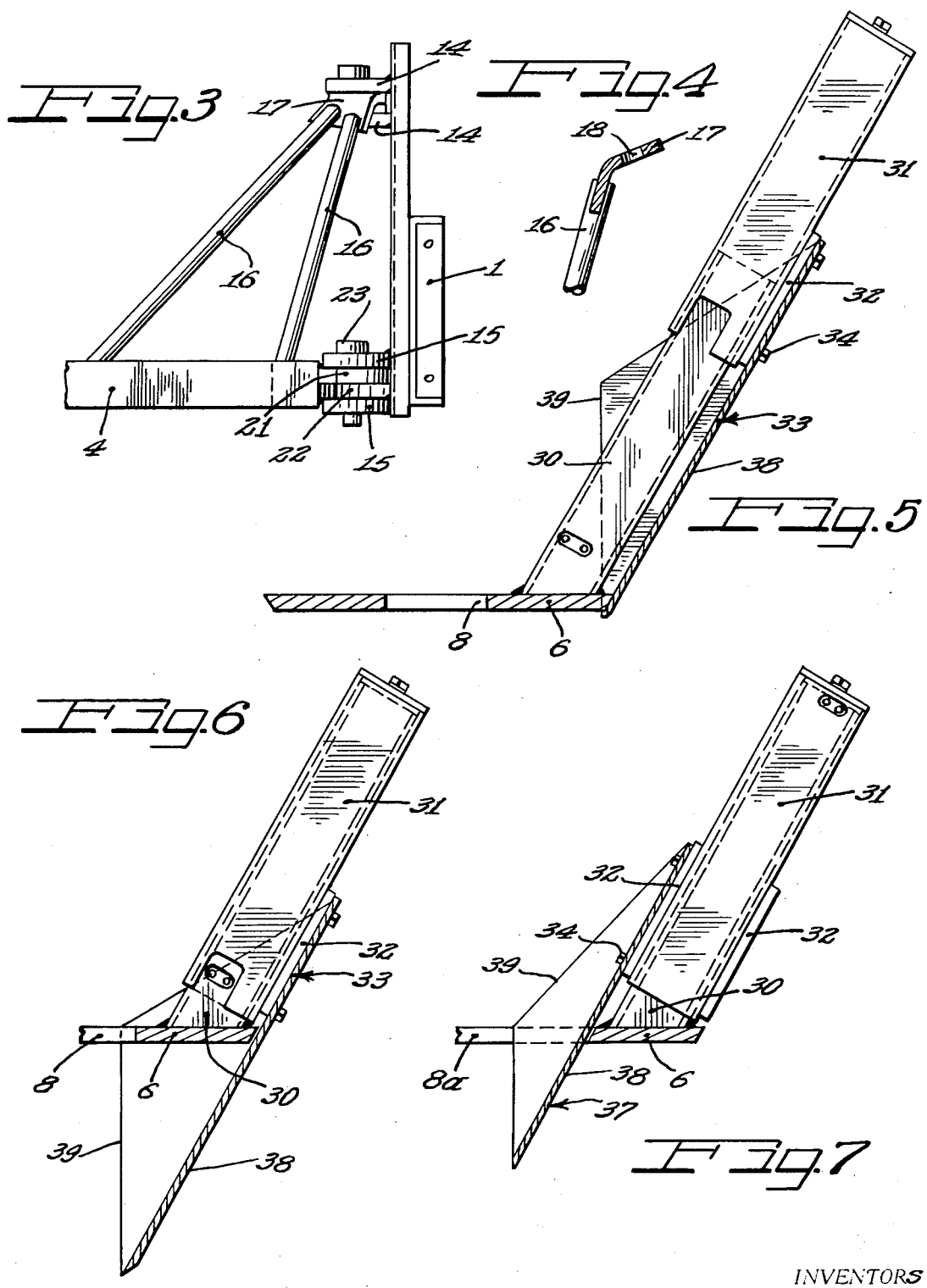

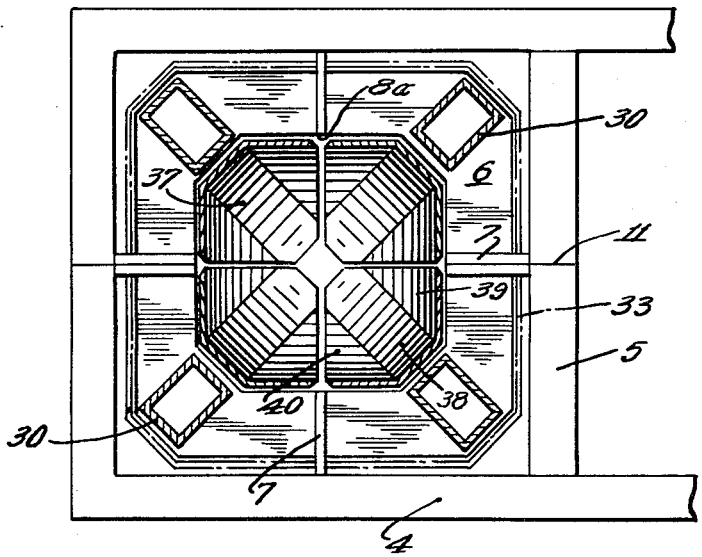
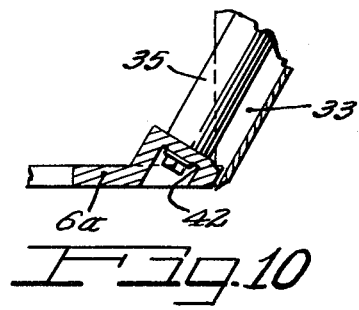
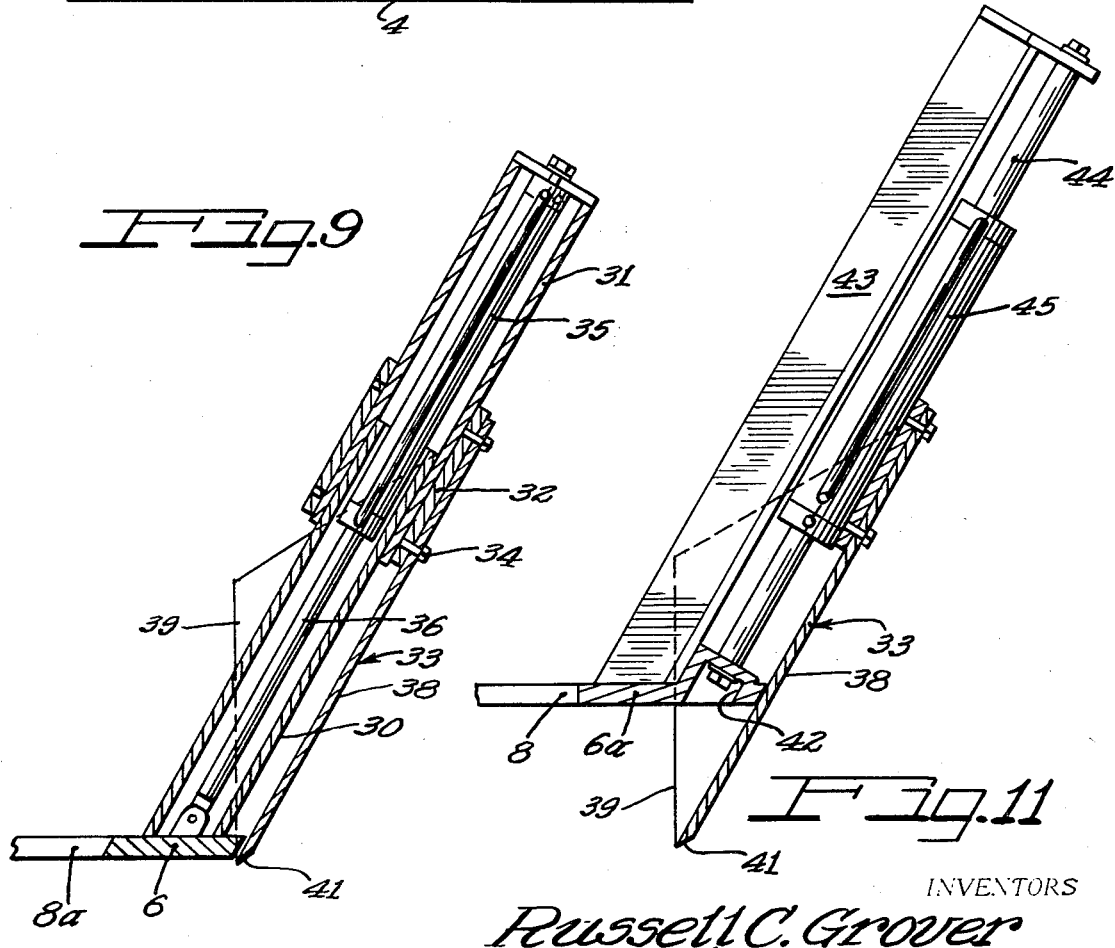
INVENTORS
Russell C. Grover
Phillip C. Grover
ATTORNEYS

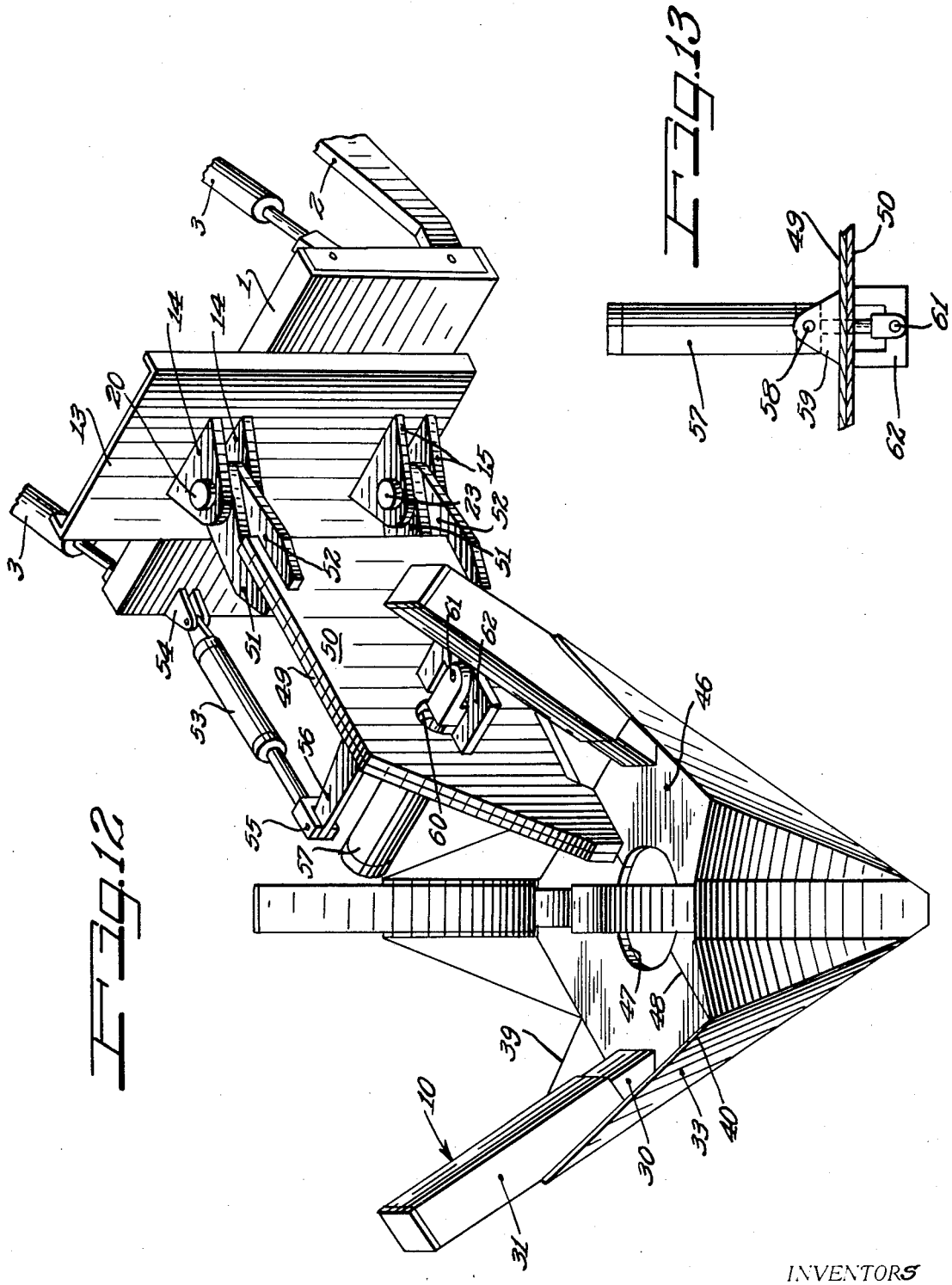

TRANSPLANTER WITH STRESS COMPENSATING BLADE GUIDE MEANS

SUMMARY OF THE INVENTION

The instant invention is an improvement upon the power operated embodiments of a transplanter set forth in our U. S. Letters Pat. No. 3,460,277 issued Aug. 12, 1969.

The instant invention is attached to a vehicle, such as a truck or tractor, having a source of fluid pressure, each moving part of the transplanter being operated from the vehicle by way of a hydraulic cylinder and piston, one of which is movable relatively to the other and the moving transplanter part is connected to the one moving element of the cylinder-piston combination. Such a hydraulic cylinder and piston arrangement is used individually for each cutting blade of the transplanter to force the blade into the ground and remove the blade at the end of the transplanting operation. The blades are of an improved shaping and mounted so that they can be easily removed and replaced; and larger blades may be used outside of the base plate of the transplanter while smaller blades may be used inside the base plate for root pruning or picking up a lesser mass of earth in the case of a smaller plant. In most instances, a spade guide tube is telescopically associated with a spade thrust tube, the blade or spade being carried by the latter, and these tubes are preferably of a cross-section preventing any rotation of the blade if resistance is encountered that is concentrated on one side of the blade, such as cutting through a root. The hydraulic cylinder and piston are contained within the tubes and are therefore protected, and smaller cylinders and piston rods may be utilized since the bending stress is transferred to the tubes, thereby adding materially to the economy of production and use. The base plate, apertured to go around the bole of a plant is divided into two equal sections laterally pivotal as a unit to guide the transplanter in the proper direction, and spreadable apart for proper engagement around the plant bole. The transplanter is economical and quite rapid in use.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a fragmentary isometric showing of a transplanter embodying principles of the instant invention, illustrating the same in operative position for the removal of a plant and a mass of earth around the roots of the plant;

FIG. 2 is a fragmentary plan view of the righthand portion of the structure of FIG. 1;

FIG. 3 is a fragmentary elevational view of the structure of FIG. 2;

FIG. 4 is a fragmentary detail view illustrating the top structure of the supporting posts of FIG. 3 with the hinge plate:

FIG. 5 is an enlarged elevational view of one form of blade assembly, showing the blade in uppermost position;

FIG. 6 is a fragmentary elevational view of the structure of FIG. 5 showing the blade in lowermost position;

FIG. 7 is a fragmentary part-sectional part-elevational view showing a smaller blade for use inside the base plate;

FIG. 8 is a fragmentary plan sectional view illustrating the converged position of the blades inside the base plate and diagrammatically indicating the disposition of blades outside the base plate;

FIG. 9 is an enlarged fragmentary vertical sectional view of the structure of FIG. 7 with a larger blade operating outside the base plate;

FIG. 10 is a fragmentary detail showing a blade assembly without a guide tube;

FIG. 11 is a fragmentary part-sectional part-elevational view of a modified form of blade assembly;

FIG. 12 is a fragmentary isometric view of a more economical and compact form of transplanter which is perhaps better suited for operation in a nursery having closely spaced rows and plants; and FIG. 13 is a part-sectional part-elevational view of the hydraulic cylinder and piston utilized to spread the divided base plate to facilitate engagement around the plant.

DESCRIPTION OF THE PREFERRED EMBODIMENTS

It will be understood that the instant invention is attached to a truck or the like in a known manner, such vehicle not being shown in the drawings. With reference now to FIGS. 1, 2, 3 and 4, it will be seen that the transplanter is connected to a vehicle mounting panel 1 carried on a pair of arms 2 which are connected to the vehicle in a known manner. Like hydraulic cylinder and piston assemblies 3—3 are connected to the upper portion of the panel 1 for elevating and lowering the transplanter from the vehicle, also in a known manner. Further, it will be understood that all of the hydraulic cylinder and piston assemblies utilized in the transplanter will have suitable hydraulic lines connected to the vehicle for operating the assemblies.

The transplanter itself embodies a generally rectangular frame 4 one end of which is pivotally connected to the panel 1 and which frame has an intermediate cross frame member 5 therein defining a substantially square portion at the free end of the frame in which portion is a base plate 6 to rest on the ground around the bole of a plant. The base plate 6 is supported by a plurality of brackets 7 welded to both the base plate and the frame. The base plate is apertured as at 8 to fit around the bole of the plant. The base plate is thus suspended and spaced from the frame, allowing the cutting blades or spades to operate outside the base plate but inside the frame. A spade or blade guide plate 9 is provided on the frame for each spade or blade assembly, generally indicated by numeral 10, there being four such assemblies shown in the illustrated embodiment, although that number is not critical but is highly convenient for manufacture and use of the transplanter. Each guide plate is shaped correspondingly to the outer face of a spade.

The entire frame and base plate are centrally divided as indicated at 11 into two allochiral half sections which can be laterally separated or spread apart to facilitate positioning the transplanter with the hole 8 in the base plate embracing the bole of a plant. At the outer end thereof, there is a tapered tongue and groove joint 12 to insure alignment of the frame when in closed position. The frame is hingedly mounted on a hinge panel 13 welded to the aforesaid vehicle mounting panel 1. Welded to the hinge panel 13 is an upper pair of spaced hinge lugs 14—14 and in alignment therebelow is another pair of hinge lugs 15—15. On each side of the frame a pair of upstanding converging support posts 16—16 are provided, the lower ends thereof being welded to the respective side of the frame, and the upper ends on one side of the frame being welded in the manner shown in FIG. 4 to a bent swivel plate 17 apertured as at 18 to accommodate a hinge pin. The supporting posts on the opposite side of the frame are both connected at the top to another swivel plate 19, the two swivel plates 17 and 19 being superposed and disposed between the brackets 14—14, and a hinge pin 20 inserted through suitable apertures in all four elements. Opposite the lower lugs 15—15 one side of the frame is provided with a swivel plate 21 while a swivel plate 22 is welded to the opposite half of the frame, these two plates being superposed between the lugs 15—15 and a hinge pin 23 inserted.

For spreading the halves of the frame apart and bringing them back together again a hydraulic cylinder and piston rod assembly 24 is mounted transversely between the sides of the frame 4. In the illustrated showing the piston rod of the assembly is pivotally connected to a lug 25 on one side of the frame and the cylinder is pivotally connected to a lug 26 on the opposite side of the frame. The frame can also be bodily pivoted relative to the hinge panel 13 to facilitate heading the frame directly toward a plant to be transplanted. To this end, another hydraulic assembly 27 extends along one side of the frame lengthwise thereof and is pivoted at one end to lugs 28 bolted to the vehicle mounting plate 1 and at the opposite end is pivotally connected to a bracket 29 welded to the frame.

With reference now to FIGS. 5, 6, 7, 8 and 9, it will be seen that the preferred form of each spade assembly 10 includes a guide tube 30 welded to the base plate 6 and a spade thrust tube 31 in telescopic relationship with the guide tube. Bolted to a pad 32 on the lower outside portion of the thrust tube is a blade 33. The guide and thrust tubes are disposed at an angle to the base plate so that the blades will converge beneath the roots of a plant when forced into the ground. The guide and thrust tubes in the illustrated instance are shown substantially square, but that particular shape is not essential, substantially any cross-sectional shape other than round being satisfactory for the purpose of preventing rotation of the blade should one side of the blade strike an obstacle such as a stone, root, or the like, while the other side of the blade is free to pass through the earth. Maintaining the blade rigid in that manner provides more satisfactory operation and insures a proper mass of dirt around the roots of the plant. The tubes 30 and 31 are preferably fitted as intimately as possible without interfering with a relative sliding movement therebetween. Where cylindrical thrust and guide tubes are utilized, each blade is prevented from rotating by the base plate and a guide plate 9.

As seen best in FIG. 9, a hydraulic assembly including a cylinder 35 and a piston rod 36 is disposed in each set of tubes. It is not important whether the cylinder is connected at one end to the closed top of the thrust tube 31 and the piston rod 36 connected to the base plate, as seen in FIG. 9, or arranged in reverse manner. It will be noted, however, that the entire hydraulic assembly is protected against the elements, ground, or other factors which might injure the operation of the assembly, by being inside the tubes. It should also be noted that smaller cylinders and piston rods may be used in each spade assembly than would have been the case heretofore because the bending stress that otherwise would be on the hydraulic assembly is transferred to the tubes 30 and 31, thereby adding to the economy of producing the transplanter as well as to the economy of use of the same. FIG. 5 discloses a blade and thrust tube in uppermost position, while in FIG. 6 the thrust tube and blade are in the lowermost position.

In the preferred form of spade assembly, as shown in FIGS. 7 and 9, a second pad 32 has been added to the inner side of the thrust tube 31 permitting the use of a smaller blade 37 which operates through the opening in the base plate 6. It is a simple expedient to remove the bolts 34 and large blade 33 and use the same bolts in the other pad 32 for supporting the small blade 37, when it is desired to trim roots or remove a smaller amount of earth with the plant.

As seen in FIG. 8, when smaller blades are utilized inside the aperture in the base plate 6, that aperture 8a must have a shaping corresponding to the outer faces of the blades. As seen in this Figure, the smaller blades are shown substantially in position to pick up the mass of earth around a plant, while the larger blades are indicated by dotted lines since it obviously is not practical to use both sets of blades at the same time.

Except for the difference in size, the larger blades 33 and the smaller blades 37 have the same shaping. Again looking at FIG. 8, we note that each blade has a flat central portion 38 of a size to be secured to one of the pads 32 on the thrust tube 31, and a pair of side wings 39 and 40 on opposite sides of the central portion 38 and disposed substantially at an angle of 45° to the central portion. The edges of each spade are preferably sharpened to a knife edge as indicated at 41 in FIG. 9.

If it is desirable to eliminate the guide tube 30 for economical reasons, the cylinder 35a of the hydraulic assembly may be secured to a base plate 6a (FIG. 10) having a recess 42 in the bottom of the plate to form a properly sloping base for the cylinder. In that event, however, the cylinder 35a must be of larger diameter since it is carrying a good portion of the bending stress.

Another arrangement of the spade assembly wherein both the cylinder and piston rod are disposed outside a tube, is shown in FIG. 11. In this instance a T-shaped rod 43 is welded to the base 6a and acts as a support for the outer end of a double-end piston rod 44, along which a cylinder 45 may be moved in either direction over a piston (not shown) fixed on the piston rod the lower end of the rod being anchored to the seat formed by the aforesaid recess 42 in the base plate 6a. Since the double-end rod 44 is supported at both ends, a small size cylinder 45 may still be utilized even though the hydraulic assembly is not protected.

In FIGS. 12 and 13 we have shown a modified form of transplanter in which the aforesaid frame 4 has been omitted, the modification in FIGS. 12 and 13 providing a more economical and more compact transplanter better suited for operation in a nursery having closely spaced rows and plants. In this form of transplanter, the same vehicle mounting panel 1 is utilized along with the same connections to the vehicle, and the hinge mounting plate 13 is also utilized along with the upper pair of hinge lugs 14—14 and the lower pair of hinge lugs 15—15, through which the pivot pins 20 and 23 are disposed, all as above described. Aso, in the embodiment of FIGS. 12 and 13, the same preferred form of spade assemblies 10, as above described. are utilized and the blades 33 have the same shape.

In this instance, the transplanter embodies a base plate 46 having an aperture 47 therein for embracing the bole of a plant. The base plate is divided into allochiral half sections along the line 48 and hinge plates 49 and 50 each support a half section of the base along with the spade assemblies carried thereby. The hinge plate 49 has upper and lower swivel plates 51—51 secured thereto, and the hinge plate 50 has upper and lower swivel plates 52—52 secured thereto. These swivel plates are superposed between the upper hinge lugs 14—14 and the lower hinge lugs 15—15 whereby the transplanter may either have the half portions spread apart or be wholly swung bodily in either direction.

A hydraulic assembly 53 has one end of the cylinder thereof pivotally connected to a pair of lugs 54 on the vehicle mounting plate 1 and the piston rod end is pivotally connected as at 55 to a bracket 56 secured to the hinge plate 49. This hydraulic assembly 53 is utilized to oscillate the transplanter as a whole laterally. Another hydraulic assembly 57 has the cylinder thereof pivotally connected as at 58 to a pair of lugs 59 carried by the hinge plate 49. The piston rod extends through an aperture 60 in both the hinge plates and is pivotally connected as at 61 to a bracket 62 mounted on the hinge plate 50. When this hydraulic assembly 57 is operated, the half sections of the transplanter may be laterally spread apart and then brought together again with the hole 47 embracing the bole of a plant. The spade assemblies operate in the same manner as those previously described.

The invention claimed is:

1. A transplanter having a flat base member centrally divided into half sections each having half an opening therein which when the base sections are brought together provides a complete opening to surround the bole of a plant, a supporting panel, supporting means for each said half section pivotally connected to said panel, power means to separate said half sections and bring them together around the bole of a plant, and a plurality of blade assemblies carried by said base member half sections, wherein the improvement comprises:

each blade assembly including a guide tube secured at one end to the base member and upstanding therefrom at an angle thereto;

a thrust tube telescopically associated with said guide tube for reciprocal movement relatively thereto;

a blade carried by said thrust tube to sever a part of a mass of earth around the roots of a plant;

power means to actuate said thrust tube, said power means being contained within and protected by said tubes;

the edge defining the opening for the plant bole and an outer edge of said base member being each shaped complementary to the shape of said blades; and means on both the inner and outer sides of each thrust tube to removably carry a blade, whereby selectively larger blades may be used outside the base member and smaller blades inside the base member.

2. A transplanter according to claim 1, wherein said supporting means comprise a frame around the base member, said frame being also centrally divided into half sections, and each half section of the frame supporting a half section of the base member in suspended relation.

3. A transplanter according to claim 1 wherein the supporting means for said base member comprise a pair of vertical hinge plates pivotally movable relative to said panel and toward and away from one another, one of said hinge plates being secured to each of said base half sections.

4. A transplanter according to claim 1, wherein said tubes are of complementary non-circular cross-sectional shape preventing each thrust tube from turning relative to its guide tube, whereby any blade contacting an obstruction on one side thereof is constrained to travel straight.

5. A transplanter having a flat base member centrally divided into half sections each having half an opening therein which when the base sections are brought together provides a complete opening to surround the bole of a plant, a supporting panel, supporting means for each said half section pivotally connected to said panel, power means to separate said half sections and bring them together around the bole of a plant, and a plurality of blade assemblies carried by said base member half sections, wherein the improvement comprises:

each blade assembly including a guide tube secured at one end to the base member and upstanding therefrom at an angle thereto;

a thrust tube telescopically associated with said guide tube for reciprocal movement relatively thereto;

a blade carried by said thrust tube to sever a part of a mass of earth around the roots of a plant;

power means to actuate said thrust tube, said power means being contained within and protected by said tubes;

said tubes being of complementary non-circular cross-sectional shape preventing each thrust tube from turning relative to its guide tube; whereby any blade contacting an obstruction on one side thereof is constrained to travel straight, and bending stress is transferred to the tubes.

6. A transplanter according to claim 5 said tubes being substantially square in cross section, each blade having a flat central portion for attachment to its thrust tube, and a side wing on each side of the central portion at an angle to the central portion and tapering toward the lower end of the central portion.

* * * * *